Figure 1:
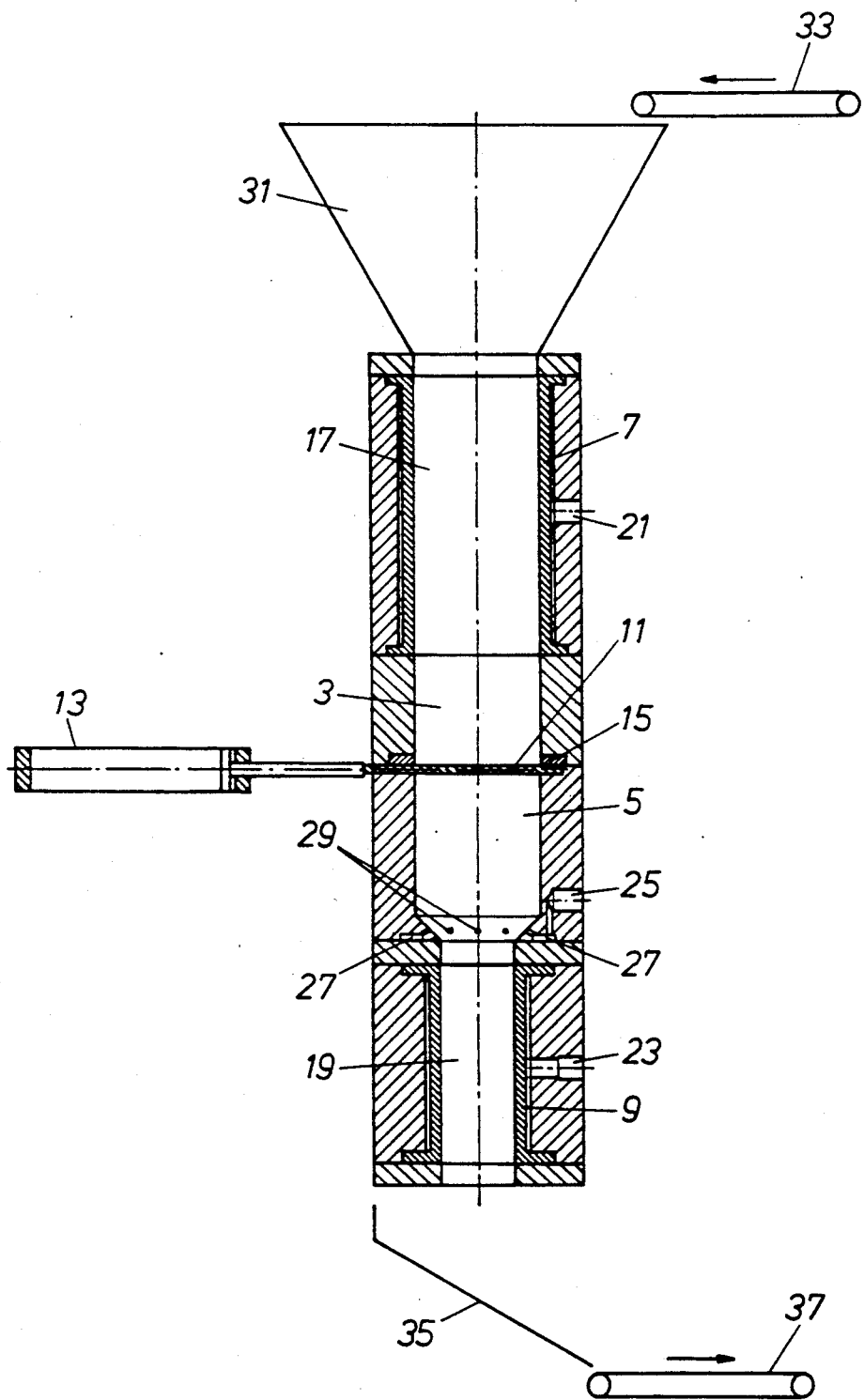

United States Patent [19]

Petersen, deceased et al.

[11] Patent Number: 5,112,269

[45] Date of Patent: May 12, 1992

[54] PROCEDURE FOR SHELLING OF CRUSTACEOUS SHELLFISH, ESPECIALLY SHRIMPS, AND APPARATUS FOR PERFORMANCE OF THE PROCEDURE

[76] Inventors: Frede H. Petersen, deceased, late of Aalborg; Kaj A. Sorensen, Bavnevangen 35, DK-9210 Aalborg SO, both of Denmark

[21] Appl. No.: 458,632

[22] PCT Filed: May 12, 1989

[86] PCT No.: PCT/DK89/00121
§ 371 Date: Aug. 9, 1990
§ 102(e) Date: Aug. 9, 1990

[87] PCT Pub. No.: WO89/10699
PCT Pub. Date: Nov. 16, 1989
(Under 37 CFR 1.47)

[30] Foreign Application Priority Data

May 13, 1988 [DK] Denmark ............................ 2630/88

[51] Int. Cl.⁵ .............................................. A22C 29/02
[52] U.S. Cl. ............................................ 452/5; 452/8; 452/15
[58] Field of Search .................... 452/5, 1, 2, 8, 14, 452/15

[56] References Cited

U.S. PATENT DOCUMENTS

| | | | |
|---|---|---|---|
| 2,785,435 | 3/1957 | Lapeyre et al. | 452/5 |
| 3,230,578 | 1/1966 | Marvin et al. | 452/14 |
| 4,255,834 | 3/1981 | Lambert | 452/14 |
| 4,313,241 | 2/1982 | Comparetto | 452/15 |
| 4,951,356 | 8/1990 | Delplanque | 452/14 |

*Primary Examiner*—Willis Little
*Attorney, Agent, or Firm*—Lee, Mann, Smith, McWilliams & Sweeney

[57] ABSTRACT

An apparatus for shelling shellfish such as shrimps consists of a dosing chamber (3) and a heat treatment chamber (5) separated by a slide valve (11) and sealed by cylindrical membrane valves (7, 9). From a funnel (31) the shellfish fall down into the dosing chamber (3) whose valve (7) is closed. The slide valve (11) is opened and a portion of animals fall down into the heat treatment chamber (5), whose bottom is closed by another membrane valve (9). The slide valve (11) is closed and steam at high pressure and temperature is induced into the heat treatment chamber (5). The pressure is removed from the membrane valve (9) after which the standing overpressure in the chamber (5) blows the shellfish out of the discharge opening (19) towards a rebound plate (35). Hereby the meat and shells of the shellfish are separated.

8 Claims, 2 Drawing Sheets

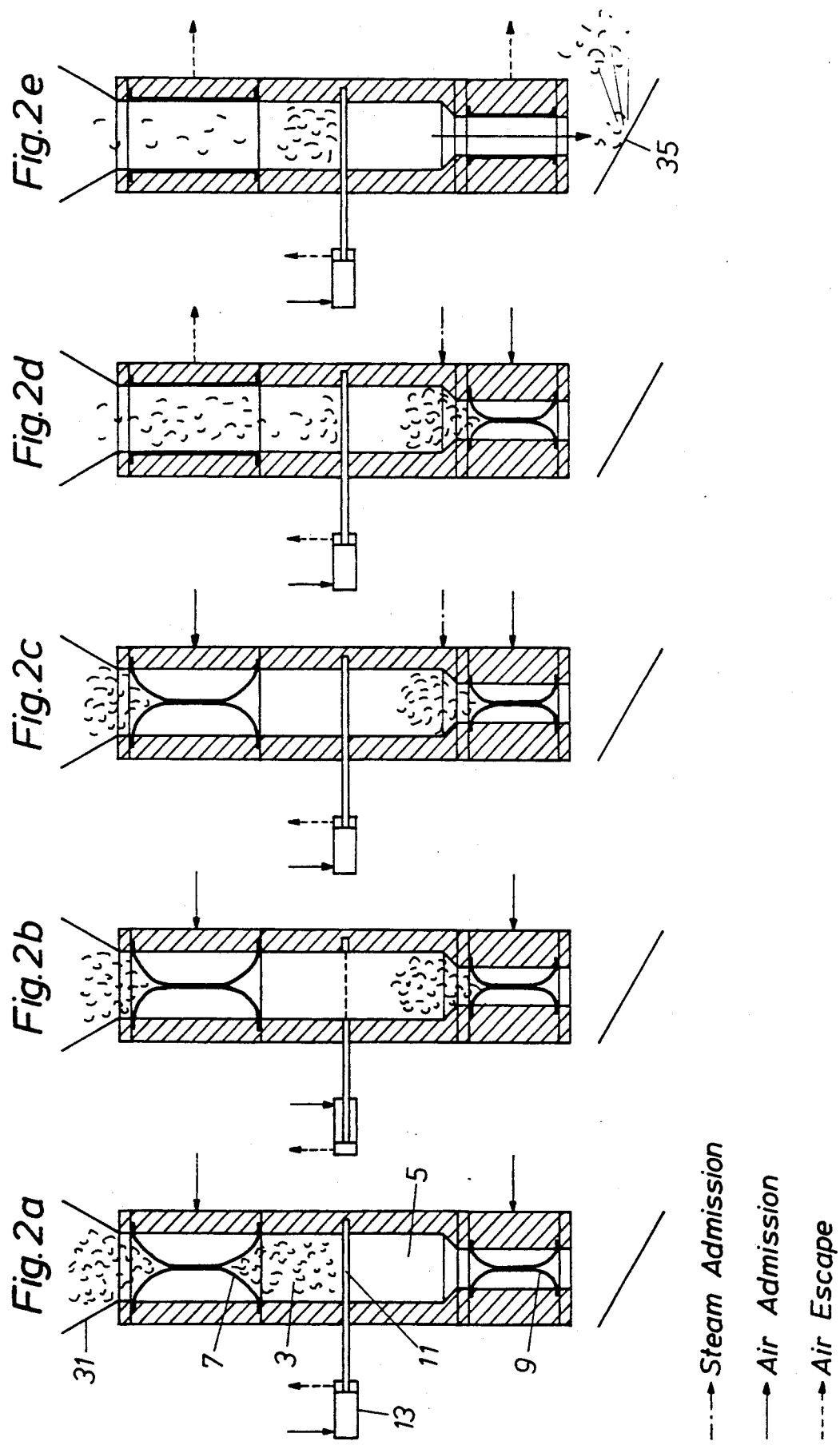

PROCEDURE FOR SHELLING OF CRUSTACEOUS SHELLFISH, ESPECIALLY SHRIMPS, AND APPARATUS FOR PERFORMANCE OF THE PROCEDURE

The invention concerns a method for shelling crustaceous shellfish, especially shrimps and prawns, where the shrimps after having been boiled and cooled, are being heated and then exposed to a pressure reduction and are transported to strike against a surface of solid material so that the shells cf the shellfish are separated from the meat, and an apparatus intended for performing the method, where the apparatus comprises one pressure-tight sealable chamber provided with at least one valve, said chamber having an opening near the bottom for discharge of crustaceous shellfish and where in the connection with the apparatus there is furnished at least one in proportion to the direction of movement of the shellfish tilted rebound plate for separation of the shellfish's meat and shells.

Such a method and such an apparatus are known from DK patent application No. 2149/87 where the shellfish in a process plant after boiling and cooling, during which the shellfish absorb a large amount of water, are transported through a heating tun and after which they fall down into funnels, whose outlets lead to a vacuum chamber. Between the outlets and the chamber there are membrane valves which are opened and closed in a laid down stroke so that the shellfish in small amounts at a time fall down into the vacuum chamber. The liquid, or the meat juice, in the heated shellfish is brought to the boiling point by the vacuum treatment so that the shells are loosened from the meat and when the shellfish inside the chamber hit the rebound plates or similar, the shells are knocked off the meat of the shellfish. Then the meat and the shells fall down into a transport liquid which is sucked out through the bottom of the chamber. In a later process the shells are separated from the meat in a wind separation unit.

However, because of the vacuum treatment in connection with the liquid transport from the chamber, the meat looses part of the meat juice, which reduces the meat's quality of taste.

The purpose of this invention is to provide a procedure for shelling shellfish, such as shrimps, during which juice and taste from the meat is lost in a much lesser degree without the process thereby being slower and thus more expensive to utilize.

According to the invention, this is obtained by a procedure of the sort as stated in the introduction, a procedure which is distinctive because of the fact that the shellfish in portions in a pressure-tight chamber at the same time are being heated and exposed to an increase of pressure by the chamber having induced one or more warm and pressurized gases and/or wet steam, upon which the pressure reduction and the movement towards the surface of solid material is provoked by opening a valve in the chamber opposite the surface.

By using the procedure according to the invention, excess pressure is being used causing the gases in the chamber to penetrate the surface of the shellfish at the same time as juice and absorbed liquid from the boiling is being heated right under the shell. During the following equalizing of the pressure, the liquid and the juice boil coinciding with the shellfish being flung against a surface of a rebound plate, which stands in the path of the shellfish's movement out of the chamber. By using the method according to the invention, meat and shells may hereby be lead away without using a transport liquid.

It is preferred to perform the procedure as stated in claim 2, where the temperature of the steam and/or the gases is between 110° and 150° C., and where the volume of their absolute pressure ranges from 1.5 to 5 bar, equivalent to an overpressure of 0.5 to 4 bar. The stay in the pressure-tight chamber can hereby be reduced to less than 10 seconds.

In a preferred embodiment of the invention, the procedure is performed as mentioned in claim 3, where, in the pressure-tight chamber within max. 0.1 second by the use of dry saturated steam, a static overpressure is built up to a volume between 2.1 and 3.1 bar. Hereby an exceptional efficient shelling of the shellfish is obtained.

The invention also concerns an apparatus intended for performing the method, where the apparatus comprises one pressure-tight sealable chamber provided with at least one valve, said chamber having an opening near the bottom for discharge of crustaceous shellfish and where in the connection with the apparatus there is furnished at least one in proportion to the direction of movement of the shellfish mounted tilted rebound plate for separation of the shellfish's meat and shells.

The apparatus in accordance with the invention makes a special preheating tun as used by the known technique unnecessary, and is furthermore considerably simpler in the same functions than those of the known apparatus, as you do not have to lead transport liquid through the chamber. Removal of shell parts and meat can take place on conveyor belts.

In order to achieve a higher process speed than that of the known technique, you can build the apparatus as mentioned in claim 5, where a dosing chamber is fitted under the membrane valve, the chamber having a volume equal to the amount of shellfish to be treated at the same time, and being placed above the pressure-tight sealable chamber and separable from the pressure-tight sealable chamber with a slide valve, the discharge opening being provided with a membrane valve and placed in the bottom cf the chamber.

When fitted with an automatic control, the apparatus can in accordance with this embodiment shell shrimps and similar shellfish at a considerable speed, as the shellfish by conveyor belt are led to the funnel on the top of the apparatus. Here they fall down into the dosing chamber whose membrane valve is open. At the same time the slide valve is closed and the dosing chamber is filled with shellfish. The membrane valve is closed so that no more shellfish can fall down at the same time, while the membrane construction does not damage the shellfish which are in the valve and the slide valve is opened. Then the shellfish can fall down into the pressure-tight chamber, the slide valve is closed, steam/gases at a suitable temperature and pressure are induced and after a suitable period of time, the lower membrane valve is opened by removing the pressure behind the membrane. The shellfish are thus shot out of the pressure chamber at high speed because of the excessive pressure in the chamber, by means of which the shells are pushed off the meat.

An embodiment of the invention is further described below with reference to the drawing where FIG. 1 shows a schematic drawing of a sectional elevation through an apparatus according to the invention, FIG. 2 shows five different working steps for the apparatus when using the method according to the invention.

The apparatus according to the invention may in a preferred embodiment consist of blocks with square cross sections stacked on top of each other and through which coaxial holes are drilled for formation of a dosing chamber 3, a heating chamber 5, a dosing valve 7 and a discharge valve 9. Between dosing chamber 3 and a heating chamber 5, a sliding valve 11 is provided depending on a pneumatic cylinder 13 can shut off the heating chamber 5 from the dosing chamber 3. Seals 15 are fitted so that a relative overpressure from the heating chamber 5 will press the valve 11 against the seals 15.

The dosing and discharge membrane valves 7 and 9 consist of cylindric pieces of material with elastic properties (elastomer material), as shown in FIG. 1 in their inactive position, and which can be brought to shut off the inlet and outlet openings 17 and 19 respectively by the use of compressed air conducted through the connecting branches 21 and 23.

Steam in an overheated or wet condition can be conducted to the heating chamber 5 through a connecting branch 25 from which the steam is conducted through a ring-shaped distribution chamber 27 to openings 29 in the chamber 5.

A receiving funnel 31 may lead boiled and cooled shellfish from a conveyor belt 33 to the apparatus. A rebound plate 35 is situated outside the discharge opening 19, and a conveyor belt 37 can remove processed shellfish and shell parts for further treatment. The rebound plate 35 can be made from a smooth stainless steel plate which is fitted to the apparatus. Other types of surfaces are acceptable within the frames of the invention, e.g. rough, chequered or other types of structuralized surfaces, and the material may have elastic properties or be synthetic.

When using the method according to the invention, the apparatus works as shown in FIG. 2, where the designations (a) to (e) indicate different stages of the shelling process.

In condition (a) the dosing chamber is filled with shellfish, the slide valve 11 and the dosing valve 7 are closed. Any shellfish stuck between the membranes in the valve 7 are not damaged in this condition because of the membrane construction where the closing mechanism is provided by the pneumatic pressure behind the membranes.

In condition (b) the valve is open and the shellfish have fallen down into the heating chamber 5, the bottom of which is closed by the discharge valve 9. In condition (c), the valve 11 is closed again and dry saturated steam is induced at a pressure between 2.2 and 3.0 bar overpressure for a period between five and seven seconds. The openings 29 and the ducts from there to the ring-shaped chamber 27 and to the connecting branch 25 are dimensioned so that the pressure in the chamber 5 is built up very quickly, i.e: during a time period of magnitude about 0.01 second. During the heating, which continues in condition (d), the dosing valve 7 is opened and a new portion of shellfish may fall from the funnel 31 down into the chamber 3. Hereafter, in condition (e), the pressure is removed from the discharge valve 9, upon which the standing pressure in the chamber 5 will blow the contents of the chamber out towards the plate 35. After this, both valves 7 and 9 are closed and the process may continue as (a).

The apparatus itself may be designed in several ways. Several apparatus can advantageously be placed together, e.g. in a circle where the discharge openings face a circular conic rebound plate. The membrane valves do not, as described here, have to be cylindrical, as the membrane might bear against a wall in each valve opening which e.g. might be semicircular with a straight side instead of being cylindrical.

Within the frames of the invention, the procedure might be performed using other apparatus than that of this description. The heating chamber could be left with one valve opening, acting as both inlet and discharge opening and the apparatus could be turned or shifted with its opening facing alternately a receiving funnel or filling branch and a rebound item. Alternatively, the apparatus itself could wholly or partly be fixed and the receiving funnel and the rebound means could be moved in proportion to the opening.

We claim:

1. A method for shelling crustaceous shellfish, comprising the steps of
   (a) boiling and cooling the shellfish,
   (b) introducing the shellfish into a pressure-tight chamber (5) and heating the shellfish in the pressure-tight chamber while exposing the shellfish when within said chamber to an increase of pressure,
   (c) opening a valve (9) to said chamber, to cause a pressure reduction in said chamber, and
   (d) causing the shellfish to exit said chamber after opening of said valve and strike against a surface (35) of solid material so that the shells of the shellfish are separated from the meat.

2. A method according to claim 1 in which method step (b) includes heating and increasing pressure with at least one warm and pressurized gas.

3. A method according to claim 2 in which heating is to a temperature of between 110° and 150° Celsius, and increasing pressure is from between 1.5 and 5 bar absolute pressure.

4. A method according to claim 4 in which method step (b) includes heating and increasing pressure with wet steam.

5. A method according to claim 4 in which heating is to a temperature of between 110° and 150° Celsius, and increasing pressure is from between 1.5 and 5 bar absolute pressure.

6. A method according to claim 5 in which step (b) includes creating within said chamber within a maximum of 0.1 second a static overpressure of from between 2.1 and 3.1 bar.

7. Apparatus intended for shelling crustaceous shellfish, comprising a pressure-tight sealable chamber (5) provided with at least one valve, said chamber (5) having an opening (19) near the bottom for discharge of crustaceous shellfish and including at least one tilted rebound plate (35) oriented at an angle relative to the direction of movement of shellfish in said apparatus for separation of the shellfish's meat and shells, in which the chamber (5) includes means for inducing gases and/or wet steam with pressure and temperature higher than those of the surrounding atmosphere and the discharge opening (19) includes another valve (9) to release the discharge opening (19) momentarily, said opening (19) facing the rebound plate (35).

8. Apparatus according to claim 7 further including a funnel (31) located to direct the shellfish to a membrane valve (7) in the top side of the apparatus, and having a dosing chamber (3) fitted under the membrane valve (7), the dosing chamber (3) having a volume equal to the amount of shellfish to be treated at the one time and being located above the pressure-tight sealable chamber (5) and separable from the pressure-tight sealable chamber (5) by a slide valve (11).

* * * * *